(12) United States Patent
Jiang et al.

(10) Patent No.: US 6,816,514 B2
(45) Date of Patent: Nov. 9, 2004

(54) RARE-EARTH DOPED PHOSPHATE-GLASS SINGLE-MODE FIBER LASERS

(75) Inventors: Shibin Jiang, Tucson, AZ (US); Christine P. Spiegelberg, Tucson, AZ (US)

(73) Assignee: NP Photonics, Inc., Tucson, AZ (US)

( * ) Notice: Subject to any disclaimer, the term of this patent is extended or adjusted under 35 U.S.C. 154(b) by 225 days.

(21) Appl. No.: 10/056,830

(22) Filed: Jan. 24, 2002

(65) Prior Publication Data

US 2003/0152115 A1 Aug. 14, 2003

(51) Int. Cl.[7] .................................................. H01S 3/30
(52) U.S. Cl. .......................... 372/6; 372/99; 372/92; 372/102; 385/37
(58) Field of Search ..................... 372/6, 92, 99; 385/37

(56) References Cited

U.S. PATENT DOCUMENTS

| | | | |
|---|---|---|---|
| 4,284,963 A | 8/1981 | Allen, Jr. et al. | |
| 4,608,697 A | 8/1986 | Coldren | |
| 4,622,671 A | 11/1986 | Tsang | |
| 4,680,767 A | 7/1987 | Hakimi et al. | |
| 4,780,877 A | * 10/1988 | Snitzer | 372/6 |
| 4,896,325 A | 1/1990 | Coldren | |
| 5,425,039 A | 6/1995 | Hsu et al. | |
| RE35,962 E | 11/1998 | Ball et al. | |
| 5,936,980 A | 8/1999 | Espindola et al. | |
| 6,137,812 A | 10/2000 | Hsu et al. | |
| 6,208,678 B1 | * 3/2001 | King | 372/72 |
| 6,229,827 B1 | * 5/2001 | Fernald et al. | 372/20 |
| 6,430,349 B1 | * 8/2002 | Hayden et al. | 385/132 |
| 2003/0049003 A1 | * 3/2003 | Ahmad et al. | 385/123 |

FOREIGN PATENT DOCUMENTS

WO   WO 99/45612   9/1999

OTHER PUBLICATIONS

S.V. Chernikov et al., Coupled–cavity erbium fiber lasers incorporating fiber grating reflectors, Optics Letters, Dec. 1, 1993, vol. 18, No. 23, pp. 2023–2025.
Charles H. Henry et al., Stabilization of Single–Frequency Operation of Coupled–Cavity Lasers, IEEE Journal of Quantum Electronics, Jul. 1984, vol. QE–20, No. 7, pp. 733–744.
Kevin Hsu et al., Continuous and discrete wavelength tuning in Er:Yb fiber Fabry–Perot lasers, Optics Letters, Feb. 15, 1995, vol. 20, No. 4, pp. 377–379.

* cited by examiner

*Primary Examiner*—Minsun Oh Harvey
*Assistant Examiner*—Dung Michael T Nguyen
(74) *Attorney, Agent, or Firm*—Eric A. Gifford

(57) ABSTRACT

A compact low-cost continuous single-mode fiber laser delivers output powers in excess of 50 mW over the C-band (1530 nm–1565 nm). The phosphate glass fiber supports the high doping concentrations of erbium and ytterbium (Er:Yb) without self-pulsation that are required to provide sufficient gain per centimeter needed to achieve high power in the ultra short cavity lengths necessary to support single-mode lasers. The use of fiber drawing technology provides a lower cost solution than either combined solution doping/MCVD fiber fabrication or waveguide fabrication. The ability to multimode clad pump the fiber further reduces cost, which is critical to the successful deployment of fiber lasers in the burgeoning metro markets.

32 Claims, 11 Drawing Sheets

YE 1: $2wt\%Yb_2O_3 + 2wt\%Er_2O_3$;
YE 2: $4wt\%Yb_2O_3 + 2wt\%Er_2O_3$;
YE 3: $6wt\%Yb_2O_3 + 2wt\%Er_2O_3$;

YE 1: $2wt\%Yb_2O_3 + 2wt\%Er_2O_3$;
YE 2: $4wt\%Yb_2O_3 + 2wt\%Er_2O_3$;
YE 3: $6wt\%Yb_2O_3 + 2wt\%Er_2O_3$;

RARE-EARTH DOPED PHOSPHATE-GLASS SINGLE-MODE FIBER LASERS

BACKGROUND OF THE INVENTION

1. Field of the Invention

This invention relates to fiber lasers and more specifically to a high power single-mode low-cost fiber laser formed from erbium and ytterbium co-doped phosphate-glass.

2. Description of the Related Art

Rare-earth doped glass fiber lasers were first proposed in the 1960s and have received considerable attention in the 1980s for potential applications in optical communication (Michel J. F. Digonnet, "Rare-Earth Doped Fiber Lasers and Amplifiers," Marcel Dekker, New York 2001). For laser emission to occur, the active fiber is placed inside a resonant cavity. The optical feedback can be provided simply by the reflectivity of the end facets, by mirrors, by distributed feedback Bragg (DFB) gratings, or by distributed Bragg reflectors (DBR), or by constructing a ring cavity structure. Laser emission occurs when the total gain overcomes the losses in the cavity. Hence, a minimum gain has to be achieved to reach the laser threshold condition.

Fiber lasers have many characteristics, among them are mode structure (transverse and longitudinal) and output power. The type of fiber, single-mode or multi-mode, which is used as the active material, dictates the transverse mode. The longitudinal mode spacing is determined by the length of the fiber cavity, the longer the fiber the narrower the mode spacing. Therefore, long resonator cavities have numerous longitudinal modes within the width of the gain spectrum. A wavelength selective reflector such as a Bragg grating can reduce the number of modes. Single mode (single wavelength) performance can be achieved using an ultra-short cavity of less than about 5 cm together with a wavelength selective reflector. Output power is dictated by the total gain, which is generally proportional to the length of the fiber. Thus, output power must typically be traded off against single-mode performance.

The most common fiber laser product is a high power multi-mode laser. Standard Erbium-doped Silica lasers require a cavity length of several meters to produce sufficient output power due to low doping concentrations. A. Claesson et al. "Novel Er:Yb:phosphate glass fiber laser pumped by a 946 nm Nd:YAG laser," Conference on Lasers and Electro-Optics, 2001 has demonstrated a similarly high power multi-mode laser with a 22 cm Erbium-doped phosphate glass fiber. Claesson's phosphate fiber has more gain per centimeter than does standard silica due to elevated doping concentrations.

Another class of products is a single-mode laser. For many optical applications such as wavelength division multiplexing (WDM), high power (>10 mW) single mode lasers are in demand. To deploy these lasers in volume in the burgeoning metro markets the lasers must be inexpensive.

Semiconductor lasers are the most prevalent in this class and by themselves are relatively inexpensive. However, a booster amplifier is required to produce output powers greater than 10 mW. The inclusion of the booster amplifier makes semiconductor lasers quite expensive and bulky.

U.S. Pat. No. 5,237,576, DiGiovanni et al. describes single mode fiber lasers of 5 cm or less using fluorine-phosphorous-doped matched index cladding, a germania-alumina-doped outer core and an alumina-erbium-doped inner core. The optical properties of this glass composition limit output power to 50 $\mu$W at a pump power of 24 mW and exhibit a slope efficiency of only 0.25%. DiGiovanni's laser would also require a booster amplifier to reach output powers in excess of 10 mW.

Southampton has demonstrated single mode performance in 1.5 cm phosphosilicate fiber lasers co-doped with Er:Yb and fabricated by the combination of MCVD (Modified Chemical Vapor Deposition) and solution doping processes (W. H. Loh et al. *Journal of Lightwave Technology*, Vol. 16, No.1, pp. 114–118 January 1998). Loh reports output power levels of 10–40 mW with a slope efficiency of approximately 25% at a single wavelength and a saturated output power level of about 60 mW. The output power attainable over an entire band such as the C-band and the saturated output power will be limited by the doping levels of Erbium, hence gain of the fiber that can be supported the phosphosilicate glass host. Doping levels of Er:Yb in phosphosilicate glass have been reported of 0.06:1.8 and 0.16:1.4 weight percent Er:Yb. (G. Vienne et al., "Fabrication and Characterization of $Yb^{3+}$:$Er^{3+}$ Phosphosilicate Fibers for Lasers" Journal of Lightwave Technology, Vol. 16, No. 11, November 1998, pp. 1990–2001) Phosphosilicate glass will not support appreciably higher doping concentrations because the ions will cluster and cause quenching.

Existing single-mode fiber lasers may exhibit a problem with "self-pulsation". To avoid self-pulsation, it is necessary to keep the $Er^{3+}$ concentration low enough to reduce ion-pair quenching, which in turn reduces gain and output power. See J. R. Kringlebotn et al. "Highly-efficient, low-noise grating-feedback $Er^{3+}$:$Yb^{3+}$ codoped fibre laser" Electronics Letters Jun. 9, 1994, Vol. 30, No. 12. pp. 972–973; Francois Sanchez et al. "Effects of ion pairs on the dynamics or erbium-doped fiber lasers" Physical Review A, Vol. 48, No. 3, September 1993, pp. 2220–2229; J. L. Zyskind et al. "Transmission at 2.5 Gbit/s over 654 km using an Erbium-Doped Fibre Grating Laser Source" Electronics Letters Jun. 10, 1993, Vol. 29, No. 12, pp. 1105–1106; and Guillaume Vienne et al. "Fabrication and Characterization of $Yb^{3+}$:$Er^{3+}$ Phosphosilicate Fibers for Lasers".

Northstar Photonics has demonstrated high power, single mode performance in planar waveguides fabricated by ion exchange techniques in Er doped phosphate glasses (PCT Publication WO 00/52791 by M. P. Bendett entitled "Rare-Earth Doped Phosphate Glass Lasers and Associated Methods"). 2.2. cm long waveguide lasers formed in Yb/Er co-doped phosphate glass showed 168 mW of output power of single frequency with TE polarization with no mode hopping for 611 mW of launched pump power at 979 nm, corresponding to a 26% slope efficiency at that particular wavelength. The fabrication of planar waveguide lasers by ion-exchange technology requires expensive photolithography manufacturing techniques. Furthermore, the total doping concentration is constrained since the glass is doped by substitution of Yb and Er for Na, and the total doping concentration cannot exceed 10 wt %.

Deployment of an all-optical network into the metro market will require compact low-cost continuous single-mode lasers that can deliver greater than 10 mW of output power over the C-band and preferably greater than 50 mW.

SUMMARY OF THE INVENTION

In view of the above problems, the present invention provides a compact low-cost single-mode fiber laser with output power in excess of 50 mW over the C-band (1530 nm–1565 nm).

This is accomplished by co-doping a phosphate glass fiber with high concentrations of erbium and ytterbium (Er:Yb).

The phosphate glass supports the high doping concentrations without self-pulsation that are required to provide sufficient gain per centimeter and the slope efficiencies needed to achieve high power in the ultra short cavity lengths necessary to support single-mode lasers. The use of fiber drawing technologies provides a low cost solution. Absorptive mode coupling facilitates multi-mode clad pumping of the ultra-short fiber, which further reduces the cost deploying fiber lasers in the burgeoning metro markets.

More specifically, the fiber is drawn from a phosphate glass preform that is doped with 0.5–5.0 wt. % erbium ions and 0.5–15.0 wt. % (single-mode core pumped) or 5–30 wt. % ytterbium ions (multi-mode clad pumped) to form a highly doped core surrounded by a phosphate cladding. At least one wavelength-selective reflector such as a grating partially defines an optical resonant cavity of 5 cm or less that encompasses the fiber and provides the feedback necessary to sustain lasing. A source of pump radiation illuminates the fiber to excite erbium and ytterbium ions and provide gain. The ultra-short cavity produces a mode spacing that is comparable to the wavelength-selective reflector's line width so that the erbium lases at a single longitudinal mode. The high gain per centimeter produces slope efficiencies of at least 30% and modeled output powers in excess of 50 mW over the C-band.

These and other features and advantages of the invention will be apparent to those skilled in the art from the following detailed description of preferred embodiments, taken together with the accompanying drawings, in which:

BRIEF DESCRIPTION OF THE TABLES

Table 1 is a table of erbium and ytterbium co-doped phosphate glass compositions for a single-mode core pumped fiber laser;

Table 2 is a table of erbium and ytterbium co-doped phosphate glass compositions for a multi-mode clad pumped fiber laser;

Table 3 is a table of glass transition and softening temperatures of core and cladding glasses; and Table 4 is a table of refractive indices of core and cladding glasses.

DETAILED DESCRIPTION OF THE INVENTION

The present invention provides a single-mode fiber laser with demonstrated output power levels in excess of 10 mW over the C-band. The fiber is drawn from a phosphate glass preform that is doped with 0.5–5.0 weight percent erbium ions and 0.5–15.0 weight percent (single-mode core pumped) or 5–30 weight percent ytterbium ions (multi-mode clad pumped) to form a highly doped core surrounded by a phosphate cladding. The Er:Yb co-doped phosphate glass fiber laser provides single-mode (single wavelength) performance with high power at low cost.

Er:Yb Co-Doped Phosphate Glass

To achieve high output power levels the glass host must support very high Er doping concentrations to realize the necessary gain, support very high Yb doping concentrations to efficiently absorb pump light in an ultra-short cavity, transfer energy efficiently from the absorbed ytterbium to the erbium and raise the saturated output power level. Compared to either silica or phosphosilicate, a phosphate glass host improves the solubility to erbium and ytterbium ions thereby allowing higher dopant levels without raising the upconversion rate and increases the phonon energy thereby reducing the lifetime of ions in the upper energy state $^4I_{11/2}$ which has the effect of improving energy transfer efficiency. Higher erbium concentrations raise the saturated output power levels and higher ytterbium concentrations increase the absorption per unit length.

The Er:Yb doped phosphate fiber is placed in a resonant cavity that provides the feedback necessary to sustain laser operation. Pumping of the Er:Yb doped phosphate glass populates the erbium metastable state creating a population inversion. Spontaneous emission catalyzes the stimulated emission of the erbium ions in the metastable state. In general, laser emission occurs when the total gain produced by stimulated emission overcomes the losses in the cavity. The gain profile of erbium and the geometry of the resonant cavity create preferential feedback so that laser emission only occurs at one or more discrete wavelengths. An ultra-short cavity together with a wavelength selective grating limits laser emission to a single wavelength.

Figure 1:
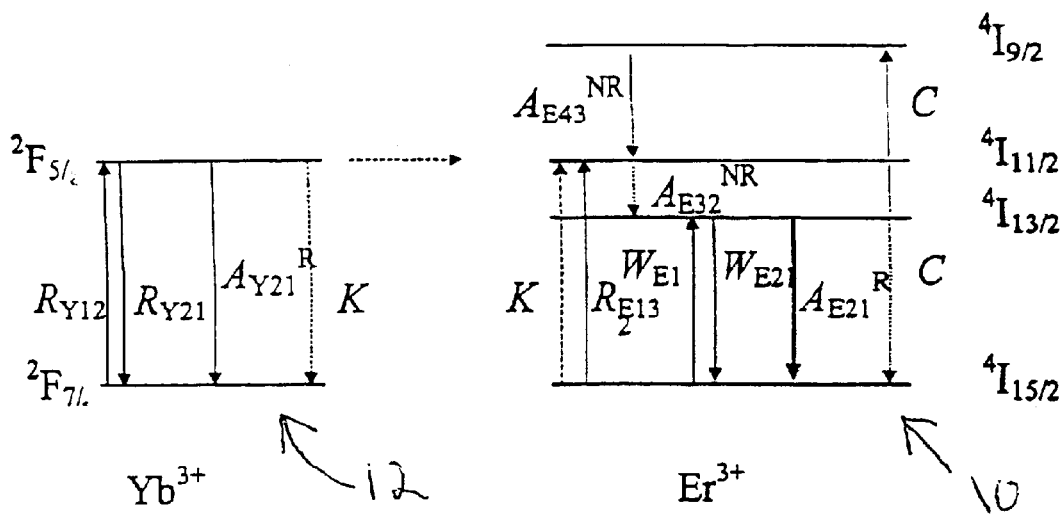
FIG. 1 is a schematic energy level diagram of the $Yb^{3+}$/$Eb^{3+}$ co-doped system in a phosphate glass host.

More specifically, the process of amplifying signals in the cavity to produce laser emission is explained in reference to energy levels shown in FIG. 1 with the $Er^{3+}$ ionic energy states 10 being shown on the right hand side. Typically, pump light excites electrons from the ground state $^4I_{15/2}$ to an upper energy state such as $^4I_{11/2}$. Higher erbium doping levels allows more absorption of the pump light and ultimately higher gain and higher output power levels. Once electrons are excited to the $^4I_{11/2}$ state, relaxation occurs through phonon processes in which the electrons relax to the $^4I_{13/2}$ state, giving up energy as phonons to the glass host material. The state $^4I_{13/2}$ is a metastable state, which normally does not readily emit a photon and decay to the ground state (i.e., the $^4I_{15/2}$ state).

Co-doping with ytterbium enhances population inversion from the erbium $^4I_{13/2}$ metastable state. More specifically, the enhancement process is explained in reference to energy levels shown in FIG. 1 with the $Yb^{3+}$ ionic energy states 12 being shown on the left hand side. The $Yb^{3+}$ excited states $^2F_{5/2}$ are pumped from the $Yb^{3+}$ $^2F_{7/2}$ ground state with the same pump wavelength that is used to excite upward transitions from the erbium ground state $^4I_{15/2}$. Energy levels of the excited ytterbium $^2F_{5/2}$ state coincide with energy levels of the erbium $^4I_{11/2}$ state permitting energy transfer (i.e. electron transfer) from the pumped ytterbium $^2F_{5/2}$ state to the erbium $^I_{11/2}$ state. Thus, pumping ytterbium ionic energy states provides a mechanism for populating the metastable erbium $^4I_{13/2}$ state, permitting even higher levels of population inversion and more stimulated emission than with erbium doping alone.

Ytterbium ions exhibit not only a large absorption cross-section but also a broad absorption band between 900 and 1100 nm. Furthermore, the large spectral overlap between $Yb^{3+}$ emission ($^2F_{7/2}$-$^2F_{5/2}$) and $Er^{3+}$ absorption ($^4I_{15/2}$-$^4I_{13/2}$) result in an efficient resonant energy transfer from the $Yb^{3+}$ $^2F_{5/2}$ state to the $Er^{3+}$ $^4I_{13/2}$ state. The energy transfer mechanism in an $Yb^{3+}/Er^{3+}$ co-doped system is similar to that for cooperative upconversion processes in an $Er^{3+}$ doped system. However, interactions are between $Yb^{3+}$ (donor) and $Er^{3+}$ (acceptor) ions instead of between two excited $Er^{3+}$ ions.

Thus, the present invention utilizes Er:Yb co-doped phosphate glass fibers doped at concentrations orders of magnitude higher than what is available in silica fibers, higher than what is available in phosphosilicate fibers, and, in the case of multi-mode clad-pumping described below, higher than even Northstar's phosphate waveguides (WO 00/52791), which are constrained to a maximum dopant level of 10 wt. %. Cooperative upconversion effects in phosphate glass at high levels of erbium doping concentration are significantly smaller than in silica glass.

Figure 2:
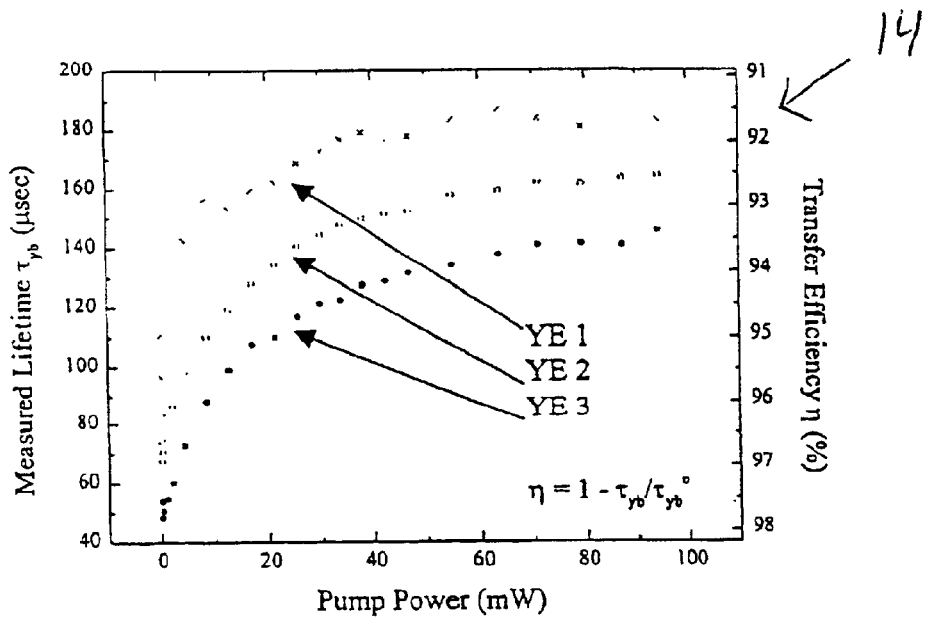
FIG. 2 is a graph depicting energy transfer efficiency from $Yb^{3+}$ ionic energy levels to $Er^{3+}$ ionic energy levels under different pumping powers for different doping concentrations of $Yb_2O_3$ and $Er_2O_3$ in a phosphate glass host.

The phosphate glass host provides for very efficient energy transfer. As can be seen from FIG. 2, a graph 14 depicting energy transfer efficiency from $Yb^{3+}$ ions to $Er^{3+}$ ions, that the energy transfer efficiency is greater than 91% for the co-doping concentrations shown. FIG. 2 shows that 6 weight % $Yb_2O_3$ and 2 weight % $Er_2O_3$ produce measured lifetimes for the ytterbium $^2F_{5/2}$ state of about 180 μs with a transfer efficiency to the erbium $^4I_{13/2}$ state of 92%. Compared to silicate and phosphosilicate glasses, the large phonon energy in the phosphate host increases the transition probability for $^4I_{11/2}$-$^4I_{13/2}$ relaxation which prevents the back energy transfer from $Er^{3+}$ to $Yb^{3+}$.

Glass Design & Characterization

The multi-component laser glass contains a network former ($P_2O_5$ phosphate), one or more glass network modifiers MO (alkaline-earth oxides and transition metal oxides such as BaO, CaO, MgO, Sro, ZnO, PbO and mixtures thereof) and one or more glass network intermediators $L_2O_3$ ($Y_2O_3$, $La_2O_3$, $Al_2O_3$, $B_2O_3$ and mixtures thereof). The modifier modifies the phosphate's glass network, thereby reducing its melting temperature and creating additional dopant sites. The intermediator bridges some of the bonds in the network thereby increasing the network's strength and chemical durability without raising the melting temperature appreciably. The multi-component glasses of interest thus have a much lower softening temperature than silica ($SiO_2$), which greatly simplifies processing. The modified network provides many more sites for hosting high concentrations of rare-earth dopants such as Er and Yb without clustering problems.

In general, the network former is 30 to 80 weight percent, the modifier can be at least 5% and typically 15% by weight and the intermediator can be at least 2% and typically 10% by weight of the multi-component glass. The fiber core is then doped with high concentrations of rare-earth dopants such as erbium or co-doped with, for example, erbium and ytterbium. The cladding layer(s) are typically undoped. Doping levels are 0.5–5.0 wt. % erbium ions and 0.5–15.0 wt. % (single-mode core-pumped) or 5–30 wt. % ytterbium ions (multi-mode clad-pumped). Typical values are 0.5–3.0 wt. % erbium and 2–15 wt % ytterbium (single-mode) or 10–10 wt. % ytterbium (multi-mode) The glass composition may or may not include an additional glass network modifier $R_2O$ selected from the alkaline metal oxides such as $K_2O$, $Na_2O$, $Li_2O$, and $Rb_2O$. Initial experiments have demonstrated that this class of phosphate glass supports continuous single-mode lasing without self-pulsation at high doping concentrations.

Numerous glass compositions were characterized for thermal properties (crystallization, expansion coefficient, transition and softening temperatures, core-to-clad similarity), chemical durability, ability to host high Er:Yb doping concentrations without quenching, spectroscopic properties (maximum emission cross-section at 1.5 microns), linewidth (maximum breadth at 1.5 microns) and refractive index to determine a range of wt. % for each ingredient that are acceptable. Characterization provided the following results:

When configured for single-mode core-pumping, the doped phosphate glass fiber contains the following ingredients by weight percentages: $P_2O_5$ from 30 to 80 percent, $Yb_2O_3$ from 0.5 to 15 percent, $Er_2O_3$ from 0.5 to 5 percent, where the sum of the weight percentages of $Yb_2O_3$ and $Er_2O_3$ is 2.5 wt. % or greater, $L_2O_3$ from 5 to 30 percent, MO from 5 to 30 percent, MO is selected from the alkaline earth oxide group consisting of BaO, BeO, MgO, SrO, CaO, ZnO, PbO and mixtures thereof, and $L_2O_3$ is selected from the transition metal oxide group consisting of $Al_2O_3$, $B_2O_3$, $Y_2O_3$, $La_2O_3$, and mixtures thereof.

When configured for multi-mode clad-pumping, the doped phosphate glass fiber contains the following ingredients by weight percentages: $P_2O_5$ from 30 to 80 percent, $Er_2O_3$ from 0.5 to 5 percent, $Yb_2O_3$ from 5 to 30 percent, where the sum of the weight percentages of $Yb_2O_3$ and $Er_2O_3$ is 10.0 wt. % or greater, $L_2O_3$ from 5 to 30 percent, MO from 5 to 30 percent, where MO is selected from the alkaline earth oxide group consisting of BaO, BeO, MgO, SrO, CaO, ZnO, PbO and mixtures thereof, and $L_2O_3$ is selected from the transition metal oxide group consisting of $Al_2O_3$, $B_2O_3$, $Y_2O_3$, $La_2O_3$, and mixtures thereof.

In one preferred embodiment, a fiber for multi-mode clad-pumping comprises a cladding that includes 62.89% by weight $P_2O_5$,
6.10% by weight $Al_2O_3$,
22.10% by weight BaO,
6.87% by weight $La_2O_3$,
1.47% by weight $B_2O_3$, and
0.57% by weight MgO and a core that includes 55.22% by weight $P_2O_5$,
5.36% by weight $Al_2O_3$,
22.5% by weight BaO,
1.01% by weight ZnO,
2.70% by weight $Er_2O_3$, and
13.48% by weight $Yb_2O_3$.

The following disclosure describes in more detail the characterization of phosphate glasses suitable for utilization as core or cladding glasses in the phosphate glass fibers of the present invention.

Tables 1 and 2 list glass compositions in mole % of phosphate glasses designed, fabricated and characterized for single-mode core-pumped and multi-mode clad-pumped fiber lasers, respectively.

TABLE 1

Glass compositions for SM core-pumped

| Glass | P2O5 | Al2O3 | Er₂O₃ + Yb₂O₃ + La₂O₃ | BaO | ZnO |
|---|---|---|---|---|---|
| PZI | 63 | 8.5 | 3.0 | 25.5 | 0 |
| PZ2 | 63 | 8.5 | 3.0 | 25.5CaO* | 0 |
| PZ3 | 63 | 8.5 | 3.0 | 25.5MgO* | 0 |
| PZ4 | 63 | 8.5 | 3.0 | 0 | 25.5 |
| PZ5 | 63 | 8.5 | 3.0 | 9.0 | 16.5 |
| PZ6 | 63 | 8.5 | 3.0 | 19 | 6.5 |
| PZ7 | 63 | 8.5 | 3.0 | 21 | 4.5 |
| PZ8 | 63 | 8.5 | 3.0 | 23 | 2.5 |
| C11-001 | 63 | 8.5 | 3.0 | 23.5 | 2 |

*where 25.5 CaO indicates CaO has been substituted for the BaO additive and 25.5 MgO indicates MgO has been substituted for the BaO additive.

TABLE 2

Glass compositions for MM clad-pumped

| Glass | P2O5 | Al2O3 | Er₂O₃ + Yb₂O₃ + La₂O₃ | BaO | ZnO |
|---|---|---|---|---|---|
| PZI | 60.74 | 8.2 | 6.44 | 24.62 | 0 |
| PZ2 | 60.74 | 8.2 | 6.44 | 24.62CaO* | 0 |
| PZ3 | 60.74 | 8.2 | 6.44 | 24.62MgO* | 0 |
| PZ4 | 60.74 | 8.2 | 6.44 | 0 | 24.62 |
| PZ5 | 60.74 | 8.2 | 6.45 | 8.68 | 15.93 |
| PZ6 | 60.74 | 8.2 | 6.45 | 18.34 | 6.27 |
| PZ7 | 60.74 | 8.2 | 6.45 | 20.27 | 4.34 |
| PZ8 | 60.74 | 8.2 | 6.44 | 22.21 | 2.41 |
| PZ9 | 60.74 | 8.2 | 6.46 | 22.66 | 1.94 |

*where 24.62 CaO indicates CaO has been substituted for the BaO additive and 24.62 MgO indicates MgO has been substituted for the BaO additive.

Compounds with less than 10 ppm of iron or copper were used as the starting chemicals for glass preparation. The mixed chemicals were melted in an electric furnace using a quartz crucible at 1250° C. The liquid was then held at this temperature for thirty minutes. After fusing, the glass liquid was transferred to a platinum crucible, and the temperature was increased to 1350° C. Nitrogen gas was purged through the liquid to remove hydroxyl ions ($OH^{-1}$). The liquid was cast into an aluminum mold. A variety of samples from these specimens were prepared for the measurements. The refractive index of glass was measured with a prism coupler (e.g., a Metricon Model 2010) at 632.8 nm and 1550 nm. optically polished glass samples with a size of 2 cm×2 cm×0.5 cm were used in the measurements of the absorption spectrum. The thermal expansion coefficient, glass transition temperature, and softening temperature of each sample were measured on a dilatometer. The absorption spectra were recorded on a spectrophotometer (e.g., a Cary 5G).

Figure 3:
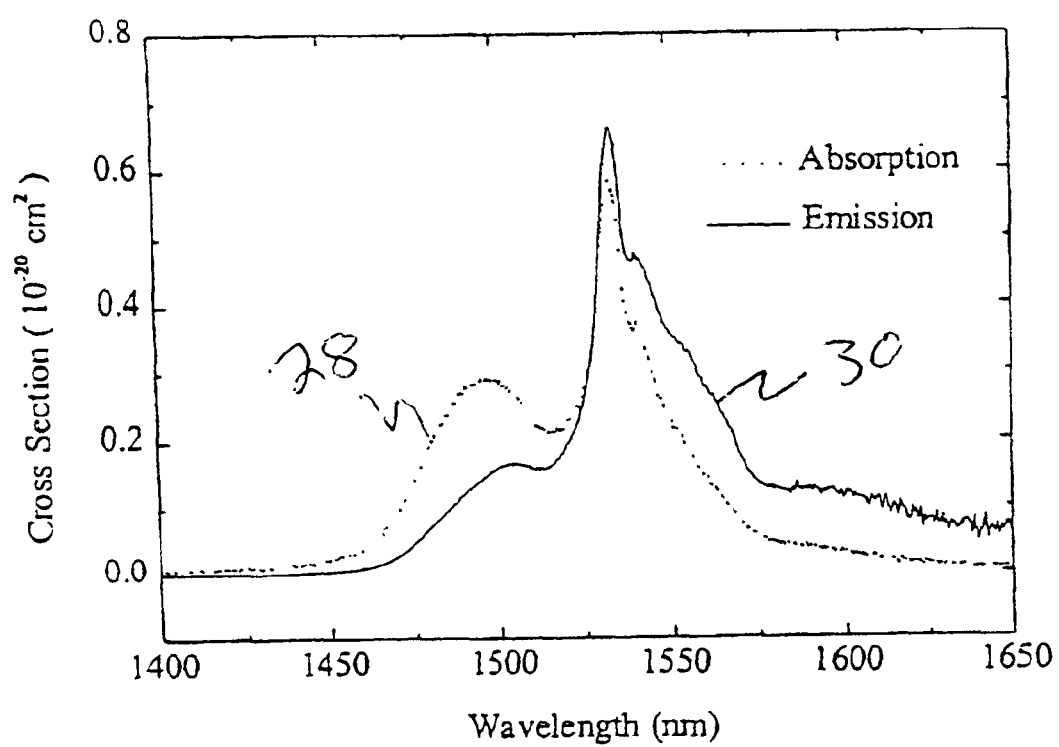
FIG. 3 is a graph showing the absorption and emission cross sections for the $^4I_{15/2} <> ^4I_{13/2}$ transition band.

Emission spectra were measured on samples with a thickness of 0.4 mm to reduce reabsorption. The emission spectrum measurement at 1.5 μm was carried out using a 980 nm diode as a pumping source. Absolute emission cross section were calculated using the McCumber theory. According to the McCumber theory, the absorption and emission cross sections are related by equation (1) if the time required to establish a thermal distribution within each manifold is short compared with the lifetime of that manifold.

$$\sigma_e(\upsilon) = \sigma_a(\upsilon) exp[(\epsilon - h\upsilon)/kT] \quad (1)$$

where $\sigma_a$ and $\sigma_e$ are the absorption and stimulated emission cross section, respectively, $\upsilon$ is the photon frequency, $\epsilon$ is the net free energy required to excite one $Er^{3+}$ ion from the $^4I_{15/2}$-$^4I_{13/2}$ state at temperature T, h is the Planck constant, and k is the Boltzman constant. The absorption cross section was determined from the absorption coefficient. The peak absorption cross section for a 63 $P_2O_5$.8.5 $Al_2O_3$.3 ($Er_2O_3$+$La_2O_3$).9.5 BaO.16 LiO (mole %) glass is $0.75 \times 10^{-20}$ $cm^2$/ion at 1.5335 μm. The peak stimulated emission cross section is calculated to be $0.82 \times 10^{-20}$ $cm^2$/ion at 1.5335 μm. The absorption and fluorescence spectra in the phosphate glass bulk exhibit wide linewidths for $^4I_{13/2}$-$^4I_{15/2}$ transition of erbium ions (48.63 nm). The absorption and fluorescence spectra, 28 and 30 respectively, of erbium doped phosphate glass bulk are illustrated in FIG. 3.

Next, undoped glasses (no erbium or ytterbium ions) were fabricated as cladding glasses. In order to insure a low stress and birefringence in the fiber, similar thermal characteristics between the core glass and the cladding glass are required. To form waveguides in the core glass with good confinement, a slightly lower refractive index of the cladding glass is also required. Cladding glasses were developed with differences in thermal expansion coefficients between the cladding glasses and the core glass of less than 3% in the temperature range from 80° C. to 400° C. In addition, glass transition temperatures and softening temperatures of these cladding glasses are also very close to that of the core glass (see Table 3 below). The 10% difference in thermal expansion coefficient between the core glass and the cladding glass is acceptable for fiber fabrication without serious stress in the fiber. Small differences in thermal expansion coefficient, glass transition temperature, and softening temperature between the core and cladding glasses ensure high quality of the fiber.

TABLE 3

Glass transition and softening temperatures of core and cladding glasses

| Glass type | Glass transition temperature ($T_g$) | Softening temperature ($T_f$) |
|---|---|---|
| C11-001 | 583° C. | 620° C. |
| D20 | 574° C. | 607° C. |

A good refractive index match with the core glass is another key parameter for the cladding glass besides the thermal behavior match. The refractive index of the cladding and core glasses is listed in the Table 4 (see below). The refractive index at 1.55 μm of cladding glass is 0.48% to 1.14% lower than the core glass P25, which results in numerical apertures from 0.149 to 0.230. With such values of numerical aperture, erbium doped optical fibers with a mode profile perfectly matched with standard telecommunication fiber can be fabricated.

TABLE 4

Refractive index of core and cladding glasses

| | Refractive index | | | |
|---|---|---|---|---|
| Glass type | 632.8 nm | 980 nm | 1300 nm | 1550 nm |
| C11-001 | 1.5729 | 1.5656 | 1.5612 | 1.5590 |
| D20 | 1.5662 | 1.5587 | 1.5549 | 1.5521 |

Finally, an ytterbium-doped glass composition of 63 $P_2O_5$.8.5 $Al_2O_3$.3 ($Er_2O_3$+$La_2O_3$+$Yb_2O_3$).9.5 BaO.16 $Li_2O$ (mole %), chosen based upon modeling and the spectral characterization results of the non-ytterbium doped glasses, was melted at 1350° C. in a platinum crucible using high purity starting chemicals. This glass composition contains 3.5 weight % erbium. The refractive index of this glass composition was measured with a prism coupler at 632.8 nm, 1300 nm and 1550 nm. The absorption and emission cross sections were determined to be $0.75 \times 10^{-20}$ cm$^2$ and $0.82 \times 10^{-20}$ cm$^2$ at 1534 nm, respectively. The thermal expansion coefficient, glass transition temperature, and softening temperature of the ytterbium-doped core glass were measured to be $8.7 \times 10^{-6}$ C.$^{-1}$, 439° C., and 480° C., respectively. The cladding glass was designed to match the thermal performance of the ytterbium-doped core glass to ensure low stress in the fiber. The difference in thermal properties between the ytterbium-doped core glass and the designed cladding glass is less than 3%.

Manufacture of Er:Yb Phosphate Glass Preform and Fiber

The high doping concentrations possible, the low cooperative upconversion rate, the high transfer efficiencies, and the high saturated output power levels make doped phosphate glass ideal for high power single-mode lasers. To achieve a low cost solution, fiber is superior to waveguides. A single preform can be drawn and diced into fibers for thousands of devices whereas a similar glass ingot provides only a few waveguides. Fiber manufacturing includes first the manufacture of the glass preform and second the drawing of the fiber from the preform.

Figure 4:
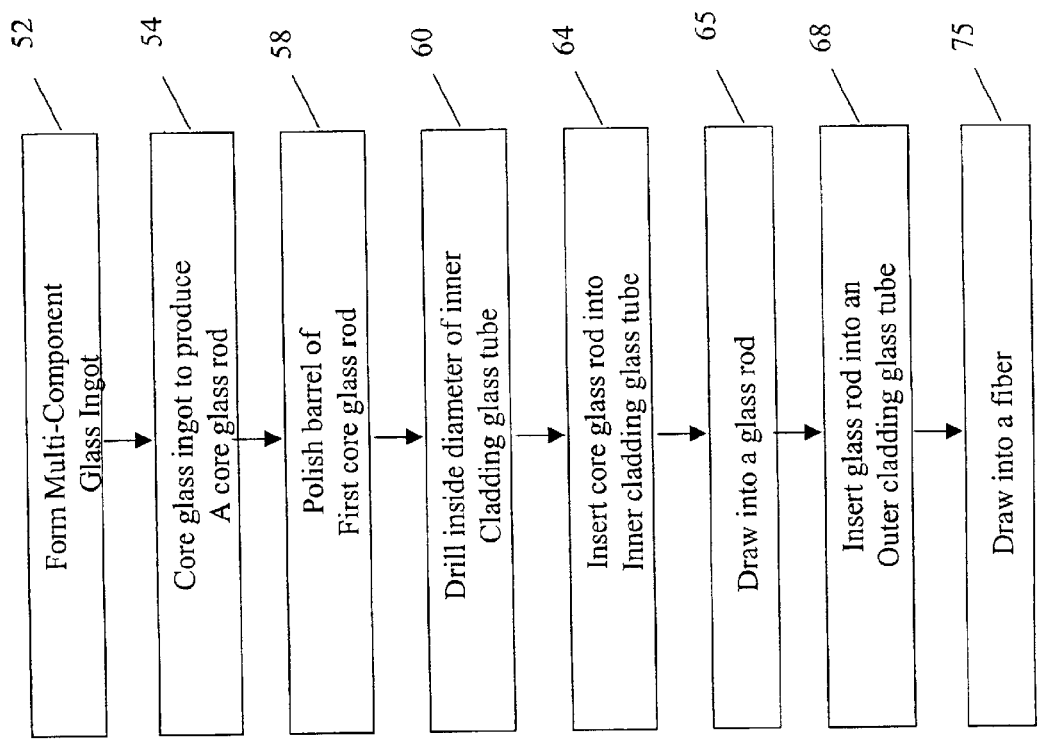
FIG. 4 is a flowchart showing the manufacture an Er:Yb co-doped phosphate glass preform and fiber.
Figure 5:
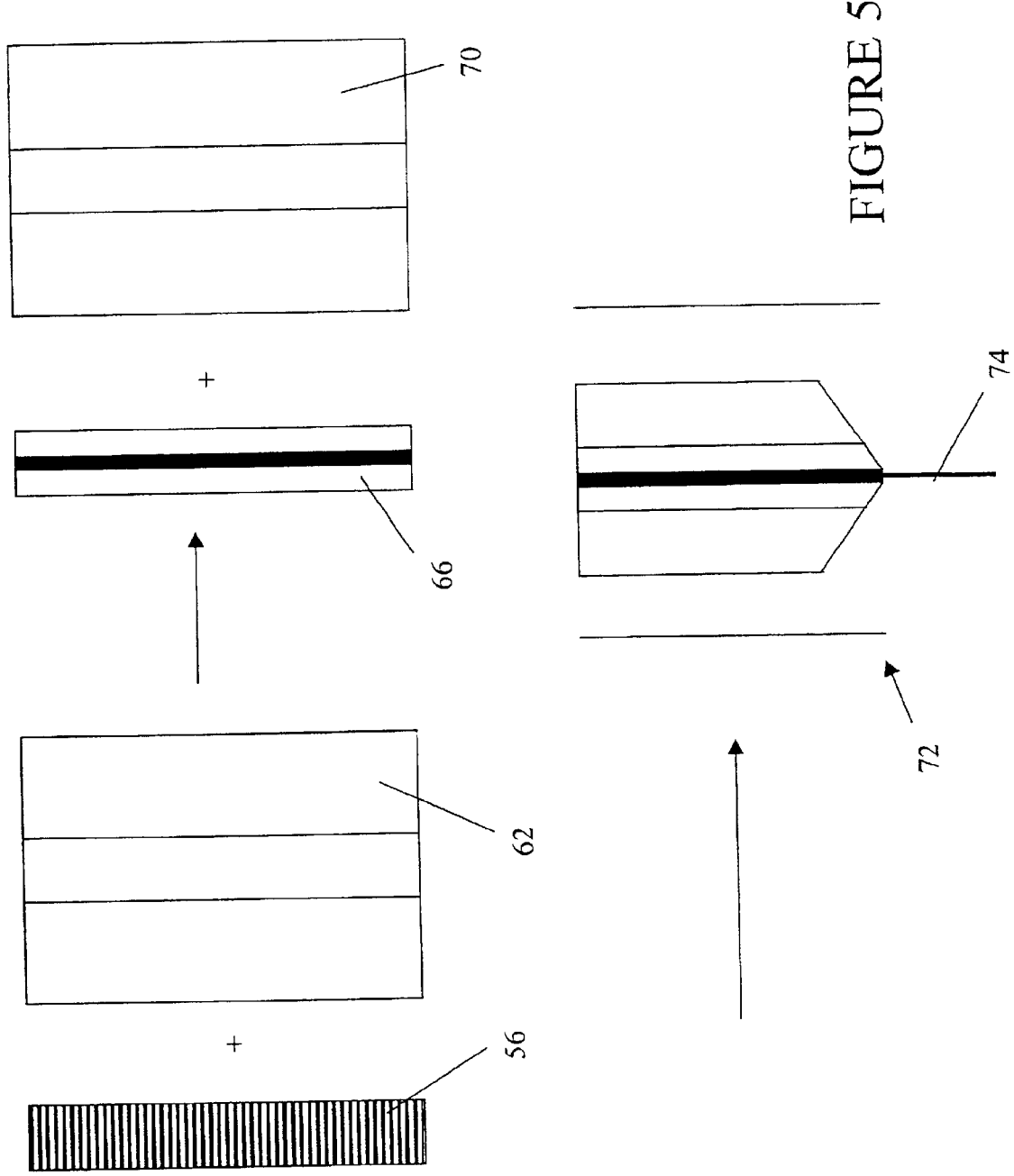
FIG. 5 is a diagram showing schematically the stages of manufacture for producing the single mode doped phosphate glass perform and fibers.

FIGS. 4 and 5 illustrate the steps of a rod-in-tube technique used to produce the glass perform and single mode phosphate glass fibers. A phosphate glass ingot (not shown in FIG. 5) containing dopants is formed in step 52. Once the ingot is formed, the ingot is cored to produce in step 54 a first core glass rod 56. The barrel of the first core glass rod 56 is polished in step 58. In step 60, a cladding glass tube 62 (i.e. a tube without erbium or ytterbium dopants) is drilled to have an inside diameter within 0.1 mm of the outside diameter of the first core glass rod. Both the inside and outside surfaces of the cladding glass tube are polished. In step 64, the first core glass rod 56 is placed inside the first cladding glass tube 62, and the assembly is drawn to form a second core glass rod 66 step 65). The second core glass rod 66 is placed, in step 68, inside a second cladding glass tube 70, and the assembly 72 is drawn into a single mode fiber 74 (step 75). Fiber drawings were performed in an argon gas atmosphere to reduce absorption of water from air exposure, which causes fluorescence quenching of Er$^{3+}$ ions. The fiber drawing was performed at 765° C. No plastic coating was applied to the fiber.

Single-Mode Fiber Laser with Er:Yb Co-Doped Phosphate Fiber

Figure 6:
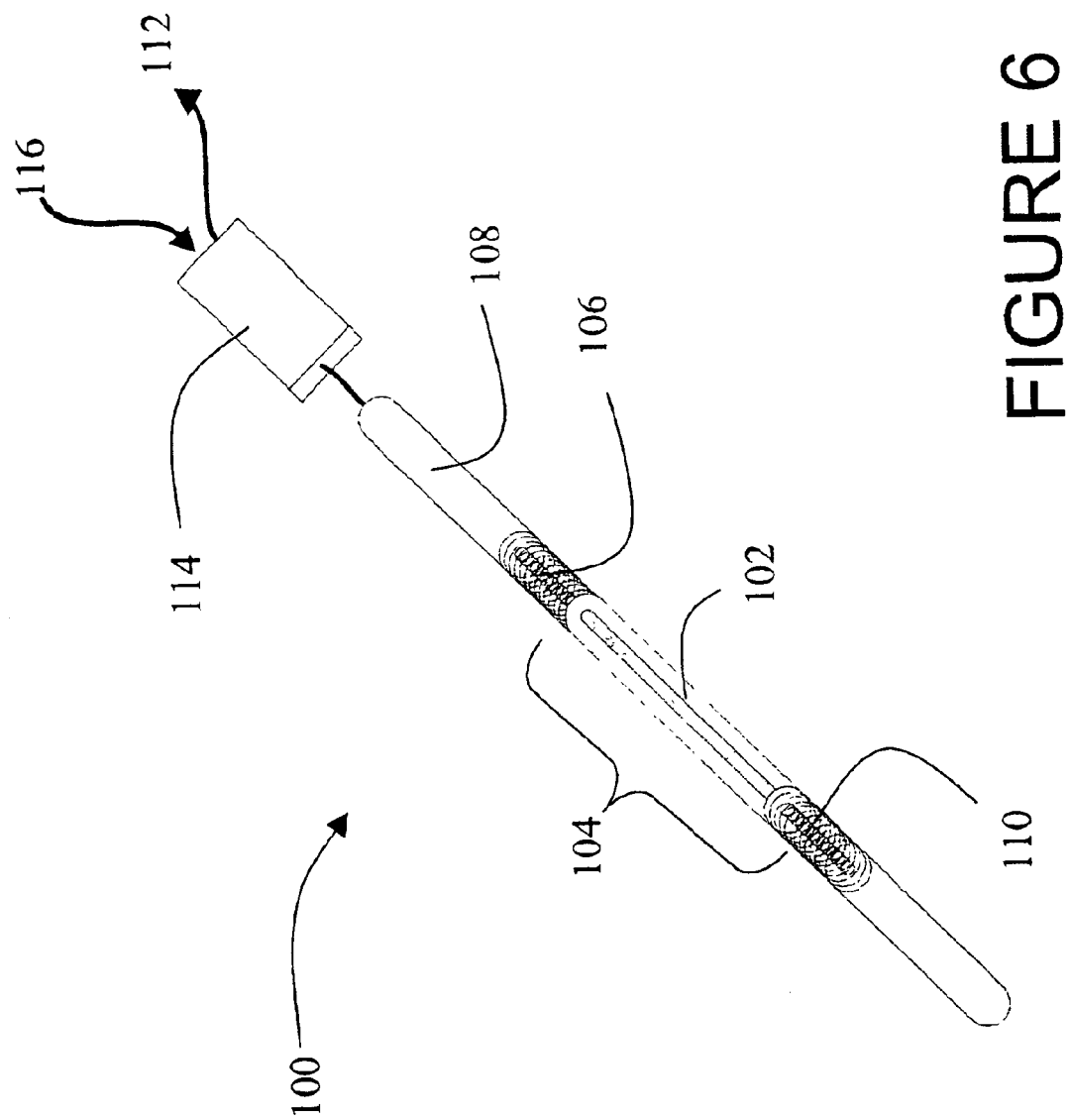
FIG. 6 is an embodiment of a single-mode fiber laser in accordance with the present invention.
Figure 7B:
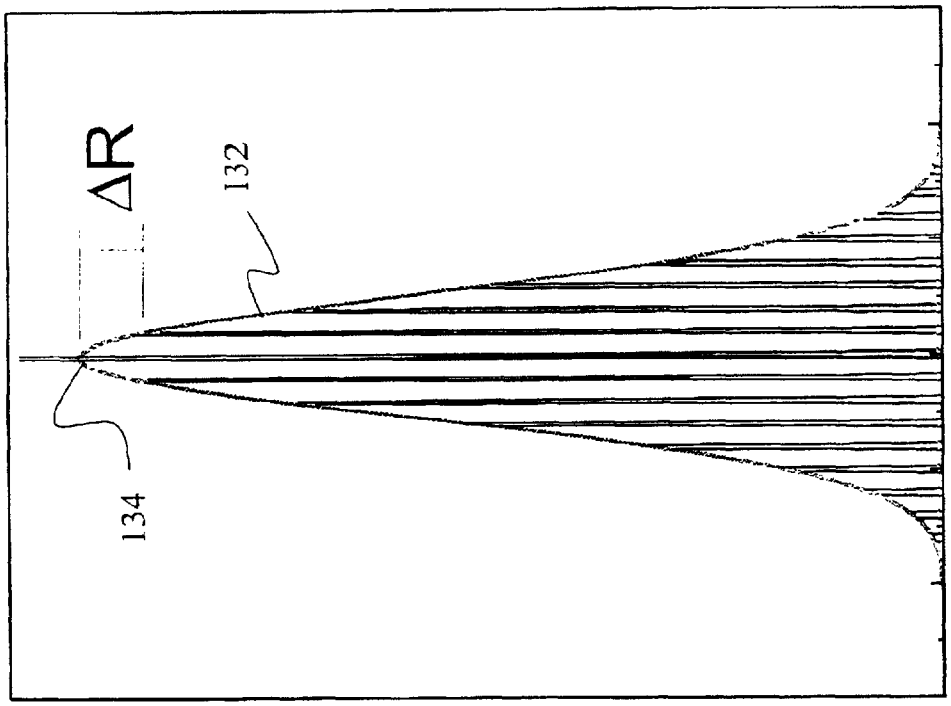
FIGS. 7a and 7b are illustrations of a cavity's mode spacing and reflector's line width required to produce single-mode (longitudinal) performance.
Figure 7A:
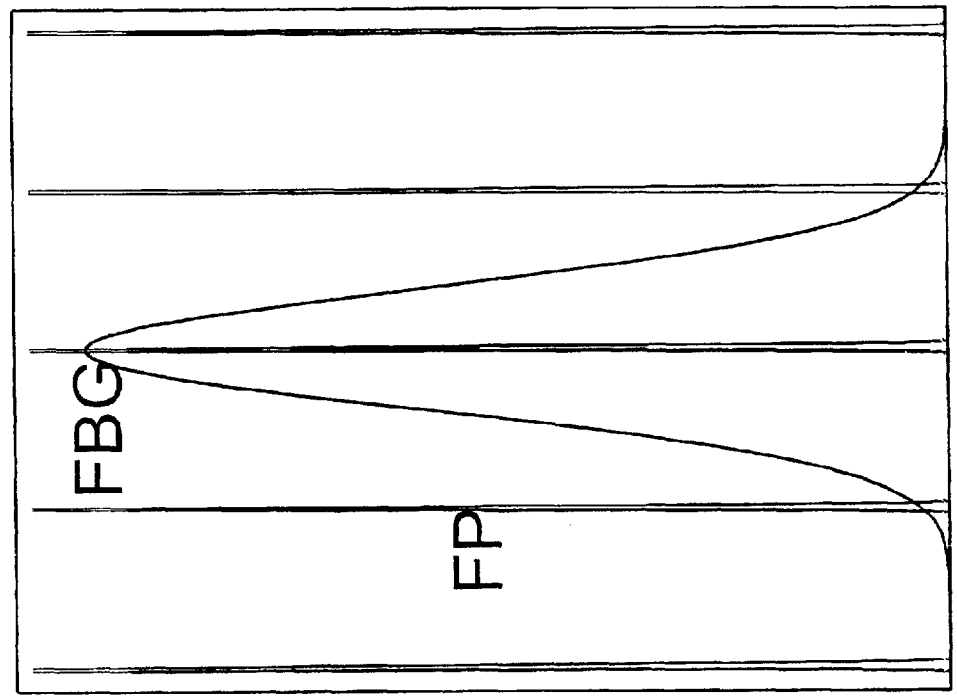

FIG. 6 is an embodiment of a single-mode fiber laser 100 in which the active gain media comprises an Er:Yb co-doped phosphate glass fiber 102. The resonant cavity 104 is formed between a Fiber Bragg Grating (FBG) 106 on a polarization maintaining (PM) fiber 108, which is optically coupled to one end of the active fiber 102, and a second FBG 110 at the other end of active fiber 102. FBG 106 provides single polarization output of the fiber laser. FBG 110 may be replaced with a dielectric mirror. As shown in FIGS. 7a and 7b, the ultra-short cavity (<5 cm) produces a mode spacing 130 that is comparable to the FBG's line width 132 so that the erbium lases at a single longitudinal mode 134. Either the wavelength selective FEG 108 or the active fiber can be temperature controlled to spectrally overlap a certain cavity mode with the maximum of the cavity reflector.

FBG 106 shown in FIG. 6 exhibits a high transmission at the pump wavelength to input couple a pump signal 116 and a high reflection coefficient (40–95%) at the lasing wavelength to both sustain lasing and output couple the single-mode signal 112. FBG 110 exhibits a high reflectance (>99.8%) at the signal-wavelength. Alternately, a dielectric mirror, either external or realized by direct coating of the fiber end facet can be used. A PM WDM 114 is coupled to the free end of PM fiber 108 to bring the pump signal 116 into the cavity and to output the single-mode signal 112 to a silica telecom fiber (not shown) through a PM Isolator (optional) to suppress any back reflection.

Figure 8:
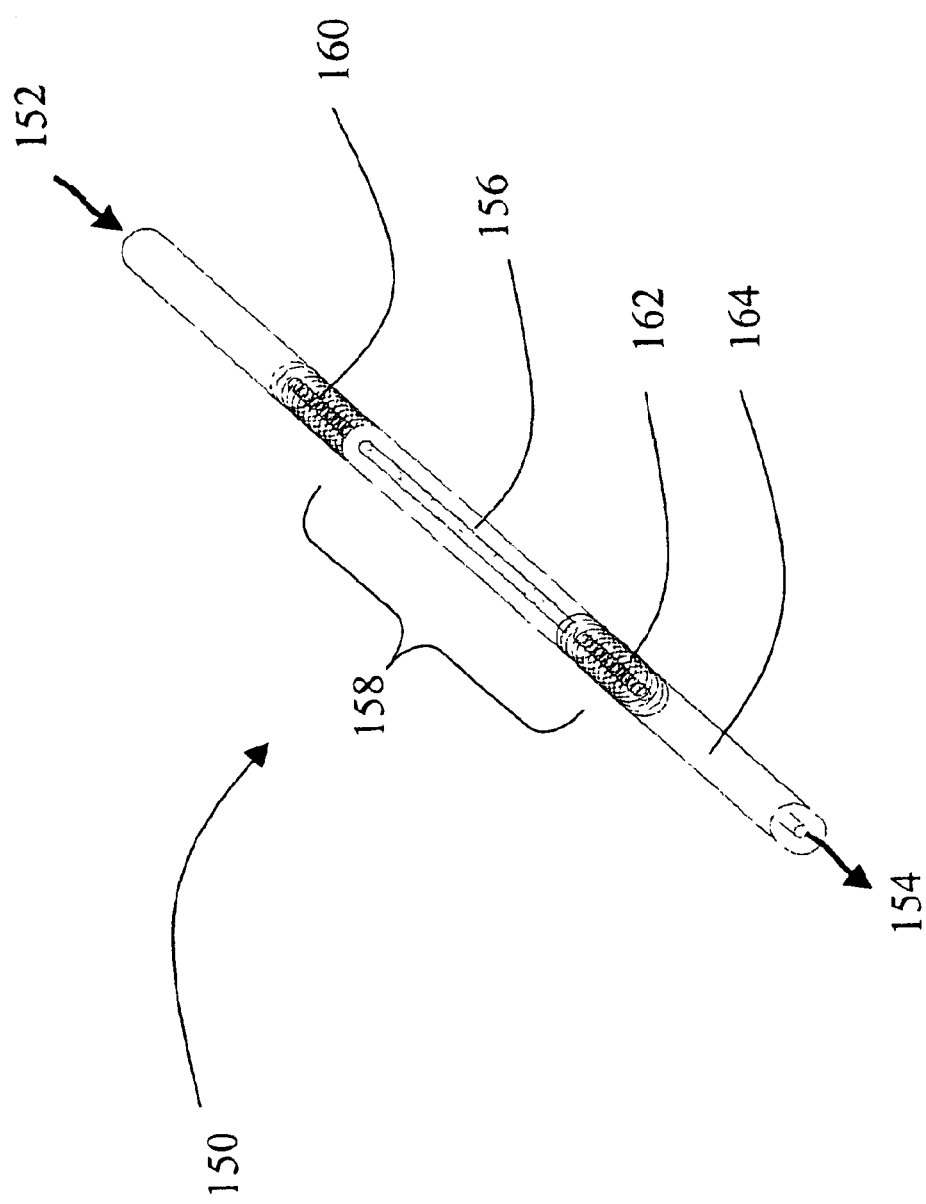
FIG. 8 is another embodiment of a single-mode fiber laser in accordance with the present invention.

FIG. 8 is another embodiment of a single-mode fiber laser 150 that eliminates the WDM 114 by input coupling the pump signal 152 and output coupling the single-mode output signal 154 at opposite ends of the Er:Yb co-doped phosphate glass fiber 156. The resonant cavity 158 is formed between a Fiber Bragg Grating (FBG) 160 at the input side of active fiber 156 and a wavelength selective FBG 162 on a polarization maintaining (PM) fiber 164, which is optically coupled to the output side of active fiber 156. FBG 160 may be replaced with a broadband dielectric mirror. A pump signal 152 is input coupled through reflector 160, which exhibits high transmission at the pump wavelength and a high reflection coefficient (>99.8%) at the signal-wavelength. FBG 162 exhibits a high reflection coefficient (40–95%) at the lasing wavelength to both sustain lasing and output couple the single-mode signal 154 and a very high reflection coefficient at the pump wavelength. A PM Isolator (optional) may be coupled to the free end of PM fiber 164 to suppress any back reflection.

Single-Mode Core and Multi-Mode Clad Pumping

Figure 9:
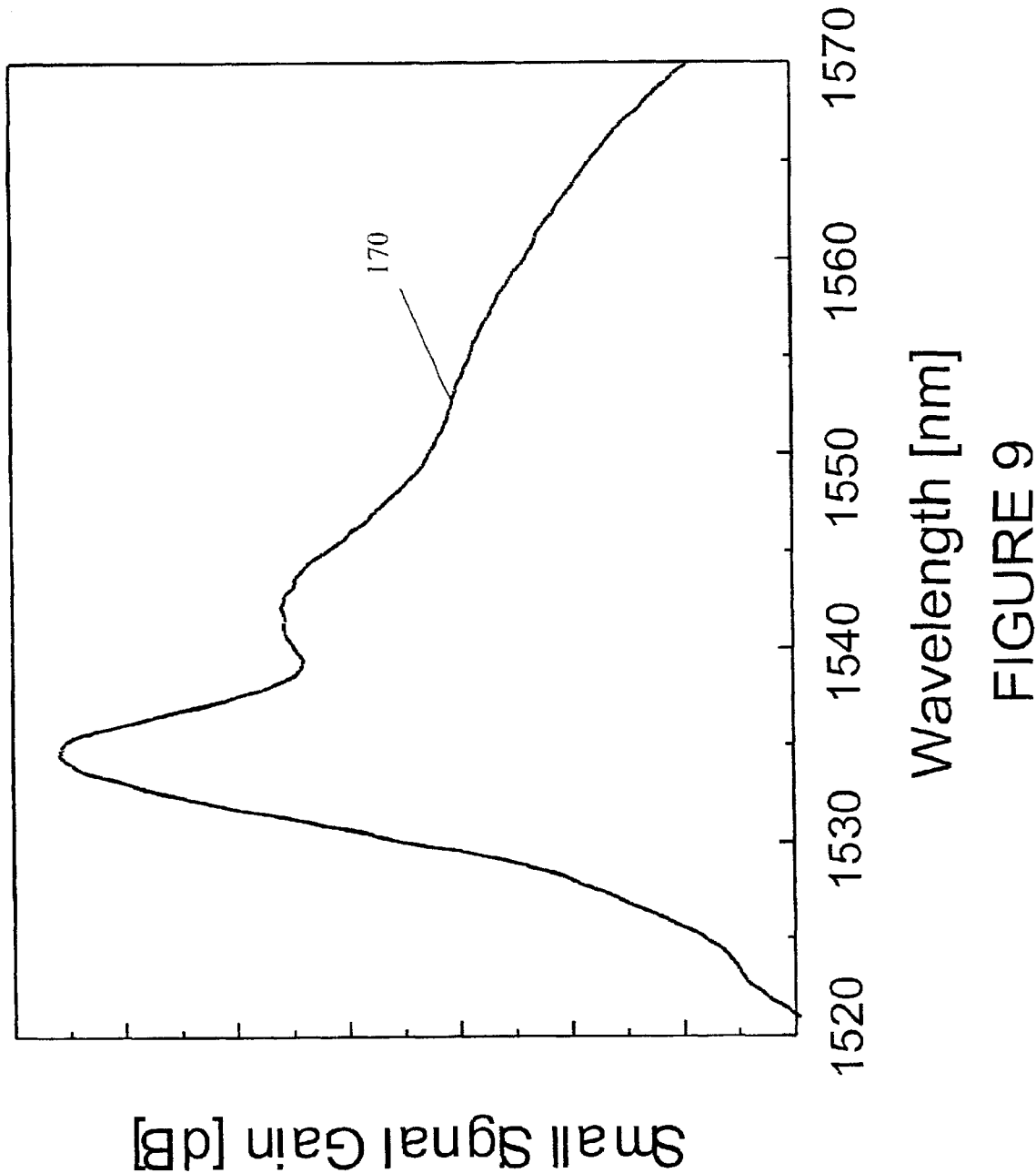
FIG. 9 is a plot of the gain profile for erbium.
Figure 10:
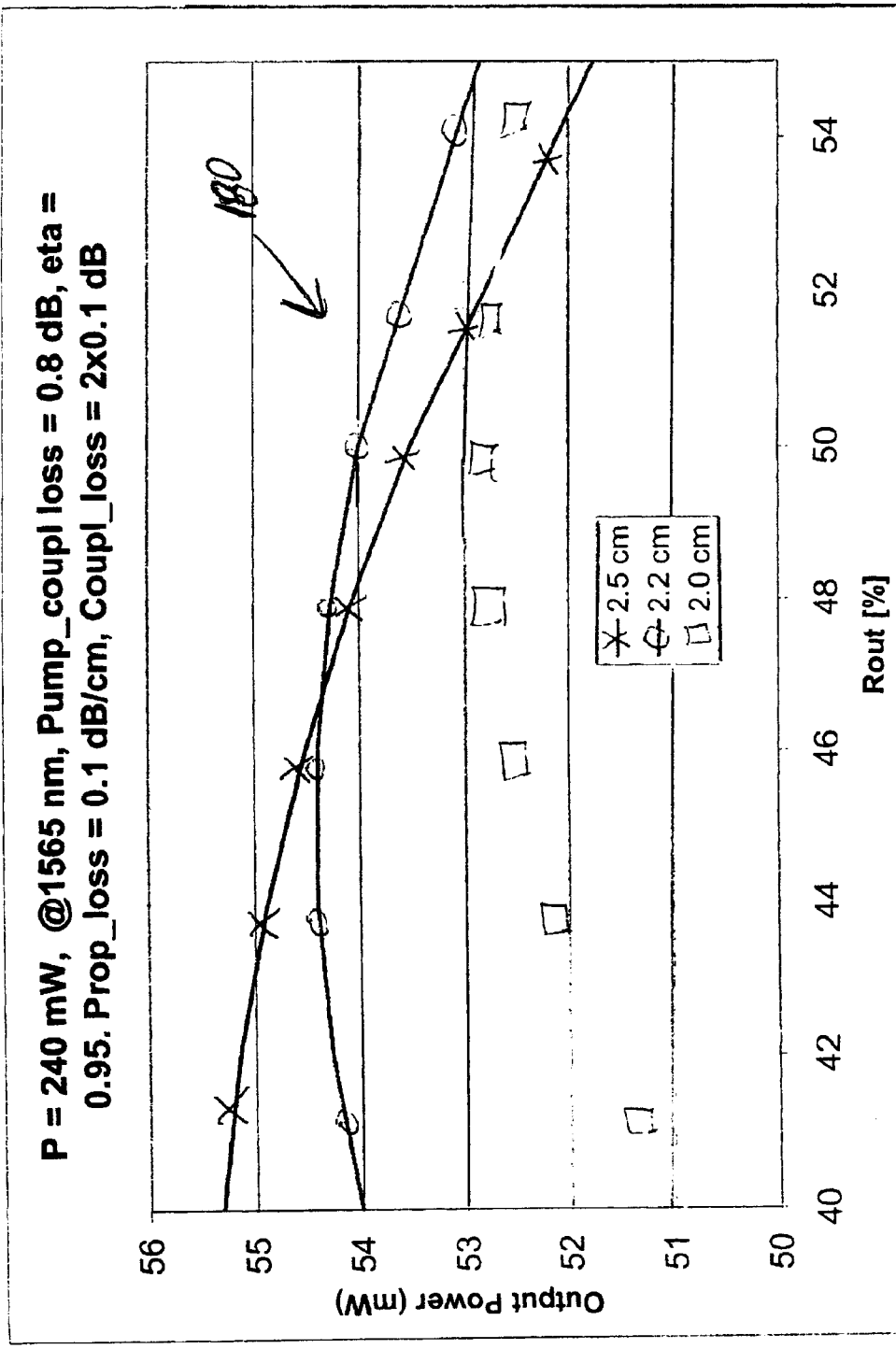
FIG. 10 is a plot of the predicted output power of the single-mode pumped fiber laser at 1565 nm with 240 mw single-mode pump.

To pump the laser, pump radiation at or near 980 nm must be coupled into the fiber and absorbed in the fiber core. The conventional approach is to align a single-mode pump laser with the fiber core and couple the pump radiation directly into the core. The advantage of this approach is that substantially all of the pump light is coupled into the core. In the present invention, the higher ytterbium concentrations translate directly to higher absorption per unit length, hence higher output powers in the short cavity lengths required for single-mode lasers. The gain profile 170 for erbium is shown in FIG. 9. Within the C band of 1530–1565 nm, the peak in the gain curve occurs at about 1535 nm and the minimum gain is at the far tail of 1565 nm. FIG. 10 plots the output power 180 for different lengths of gain fiber with a single-mode output at the wavelength of 1565 nm where the optical gain is the smallest. Using a 240 mW single-mode pump, the output power exceeds 50 mW in the worst case. In other words, 50 mW over the full C band is achievable. The drawback to single-mode core pumping is the cost of the pump laser and the cost associated with the precision active alignment required to couple the pump radiation into a few micron core.

More recently, pump schemes have been proposed for coupling pump radiation from a multi-mode pump laser into the cladding surrounding the core in a silica fiber. Based on a geometric optical model in which the incident pump field is represented as an ensemble of rays of varying position and incident angle over the cladding entrance, those ray trajectories that cross or overlap the core as they propagate down the fiber correspond to rays that are absorbed, whereas those rays that avoid overlapping the core upon propagation are assumed to suffer no absorption: The overlapping rays are associated with the low order wave optical modes of the fiber with intersect the core, and the non-overlapping rays are associated with higher order modes that are localized in the cladding and intersect the core negligibly. The fraction of the pump power that can be absorbed by the core is then approximated as the ratio of those rays that cross or overlap the core to the total number of rays. To fully absorb the available pump power in the relatively lightly doped core, the fiber must be quite long, on the order of several meters. See Anping Liu, Kenichi Ueda, "The absorption characteristics of circular, offset, and rectangular double-clad fibers" Optics Communications 132 (1996) pp. 511–518, and D. Kouznetsov, J. Moloney and E. Wright "Efficiency of pump absorption in double-clad fiber amplifiers. I. Fiber with circular symmetry" Journal Optical Society of America, Vol. 18, No. 6, June 2001, pp. 743–749. To increase the absorption efficiency, the fiber is configured (bending, D-shaped fiber, skew core) so as to perturb or scramble the rays trajectories along the fiber so that a higher fraction of the initial rays now overlap the core. See V. Doya, O. Legrand, and F. Mortessagne "Optimized absorption in a chaotic double-clad fiber amplifier" Optics Letters, Vol. 26, No. 12, June 2001, pp. 872–874. Again these techniques are only effective in long fibers of several meters.

Based on the geometric model accepted in the industry and on the known techniques for coupling the higher order modes into the core, which require long fiber lengths, it would not appear that the higher doping concentrations provided by the present invention would alone be sufficient to absorb multi-mode pump radiation to produce a high power single-mode laser. However, simulations based on wave optical modeling and confirmed by empirical data show that the higher order wave modes associated with the non-overlapping rays are in fact coupled into the core. Because the tails of the higher order modes overlap the core, the core absorption tends to perturb or mix the fiber modes converting high order modes into lower order modes that are then rapidly absorbed by the core. In conventional lightly doped silica fiber, this "absorptive mode coupling" effect is small and negligible if the silica fiber incorporates bending, D-shaped fiber or skew core. Conversely, in the highly doped phosphate glass fiber of the present invention absorptive mode coupling is a significant second order effect, second only to the direct absorption of the lower order modes.

Figure 11:
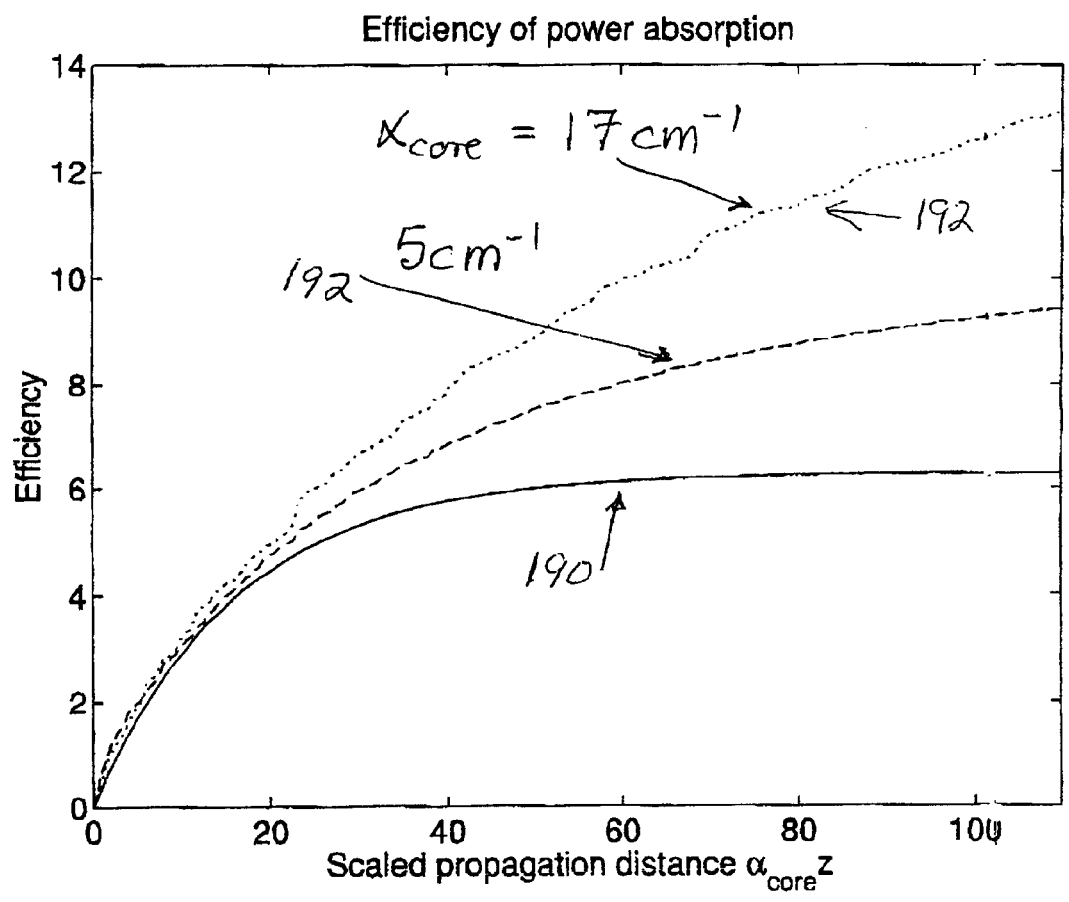
FIG. 11 is a plot of the predicted absorption efficiency using a geometric optics model and a wave equation model in accordance with the present invention.

As shown in FIG. 11, the absorption efficiency 190 (plotted against the product of the core absorption and the fiber length ($\alpha L$)) using the geometric model ramps up approximately linearly with $\alpha L$ and then saturates. The linear ramp corresponds to the absorption of the lower order modes. Saturation occurs because the geometric model predicts no absorption of the non-overlapping higher order modes. The knee in the curve is at approximately $\alpha L=20$. According to the wave equation model, which takes into account the absorptive mode coupling effect, the absorption efficiency 192 ramps up linearly as before but instead of saturating continues to increase albeit at a more gradual slope. The larger the absorption coefficient $\alpha$ (higher doping concentrations), the greater the slope. As a result, the absorption efficiency of a short fiber can be approximately doubled. The total absorption is still less than for a long optimized silica fiber or for single-mode core pumping but sufficient for a practical high power single-mode laser. In reference to FIG. 11, similar output power levels can be achieved by optimizing the size and shape of the inner cladding with multi-mode pumps on the order of 750 mW to 1.5 W.

Figure 12:
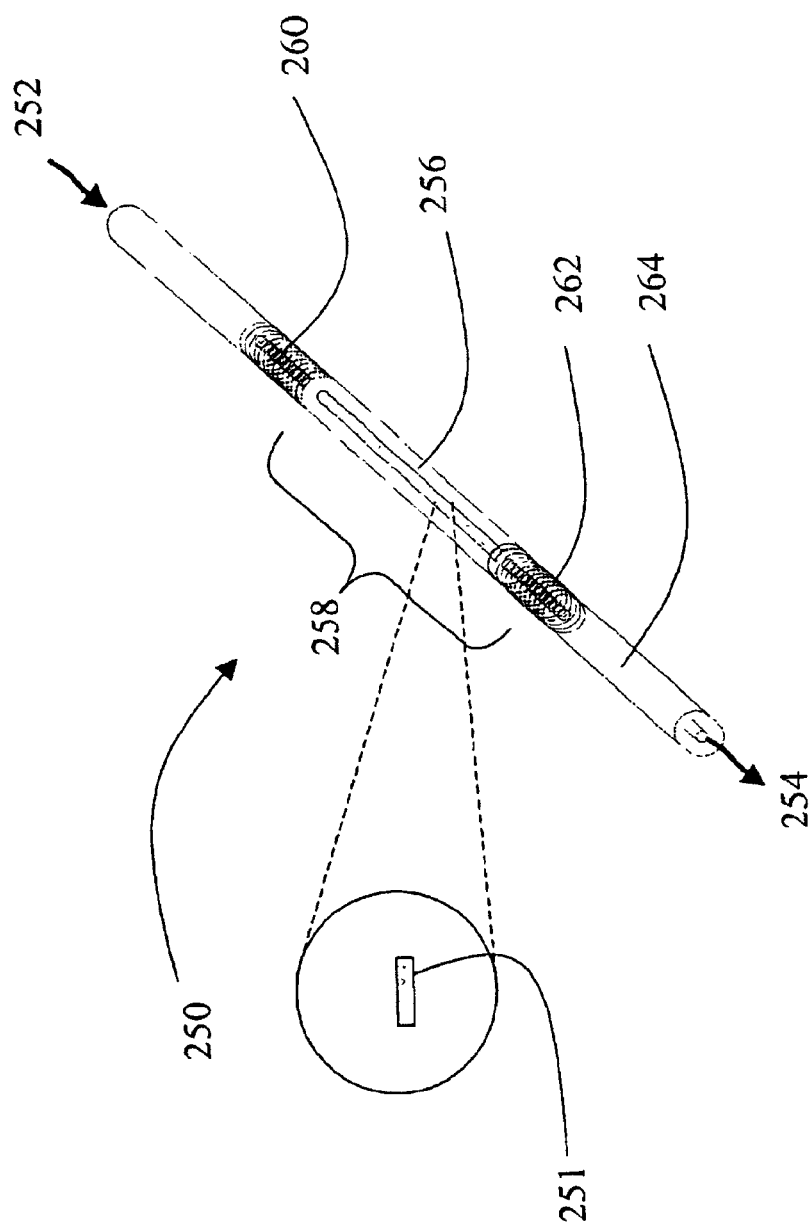
FIG. 12 is another embodiment of the fiber laser formed with a rectangular core for providing single-mode single-polarization fiber laser.

FIG. 12 is another embodiment of a fiber laser 252 formed with a rectangular core 251 for providing a single-mode single-polarization fiber laser. The pump signal 252 and the single-mode output signal 254 are coupled at opposite ends of the Er:Yb co-doped phosphate glass fiber 256. The resonant cavity 258 is formed between a Fiber Bragg Grating (FBG) 260 at the input side of active fiber 256 and a second FBG 262 264, which is optically coupled to the output side of active fiber 256. One of the FBGs may be replaced with a dielectric mirror. A pump signal 252 is input coupled through FBG 260, which exhibits high transmission at the pump wavelength and a high reflection coefficient (>99.8%) at the signal-wavelength. FBG 262 exhibits a high reflection coefficient (40–95%) at the lasing wavelength to both sustain lasing and output couple the single-mode signal 254 and a very high reflection coefficient at the pump wavelength. The rectangular core 251 creates a preferential gain for one polarization, thus producing a single polarized output. A PM Isolator (optional) may be coupled to the free end of PM fiber 264 to suppress any back reflection.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A fiber laser, comprising:

A section of fiber including,
A cladding formed from a phosphate glass host; and
A core formed from a similar phosphate glass host co-doped with 0.5–5.0 wt. % $Er_2O_3$ and 0.5–30 wt. % $Yb_2O_3$;

At least one wavelength-selective reflector having a characteristic linewidth, said reflector at least partially defining an optical resonant cavity of 5 cm or less that includes the section of fiber; and A source of pump radiation that illuminates the fiber to excite erbium and ytterbium ions in the $Er_2O_3$ and $Yb_2O_3$, respectively, and provide gain;

the length of said cavity being 5 cm or less produces a mode spacing that is sufficiently wide with respect to the wavelength-selective reflector's linewidth so that the erbium lases at a single longitudinal mode and said fiber outputs a single longitudinal and single transverse mode signal.

2. The fiber laser of claim 1, wherein the source of pump radiation comprises a single-mode laser that illuminates the fiber core, said core being doped with 0.5–15.0 wt. % $Yb_2O_3$.

3. The fiber laser of claim 2, wherein the phosphate glass hosts include the following ingredients by weight percentages, $P_2O_5$ from 30 to 80 percent,
$L_2O_3$ from 5 to 30 percent, and
MO from 5 to 30 percent, wherein NO is selected from BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof; and wherein the core is co-doped with $Er_2O_3$ from 0.5 to 5 wt. % and $Yb_2O_3$ from 0.5 to 5 wt. % with a sum of 2.5 to 10 wt. %.

4. The fiber laser of claim 2, wherein the single-mode pump laser is rated at less than 250 mW, said fiber laser providing more than 50 mW of output power in the single-mode signal.

5. The fiber laser of claim 1, wherein the source of pump radiation comprises a multi-mode laser that illuminates the fiber cladding, said core being doped with 5–30 wt % $Yb_2O_3$.

6. The fiber laser of claim 5, wherein the phosphate glass hosts include the following ingredients by weight percentages, $P_2O_5$ from 30 to 80 percent,
$L_2O_3$ from 5 to 30 percent, and
MO from 5 to 30 percent, wherein MO is selected from BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof, and wherein the core is co-doped with $Er_2O_3$ from 0.5 to 5 weight percent and $Yb_2O_3$ from 5 to 30 weight percent with a sum of 10 to 35 wt. %.

7. The fiber laser of claim 5, wherein the multi-mode pump laser is rated at less than 1.5 W, said fiber laser providing more than 50 mW of output power in the single-mode signal.

8. The fiber laser of claim 1, wherein the cladding is undoped.

9. The fiber laser of claim 1, wherein the fiber core has a rectangular cross-section, which imparts a single polarization on the single-mode signal.

10. The fiber laser of claim 1, further comprising a silica telecomm fiber, said phosphate fiber being fusion spliced to said silica telecomm fiber.

11. The fiber laser of claim 10, wherein the wavelength-selective reflector is formed on said telecomm fiber.

12. The fiber laser of claim 1, wherein the fiber exhibits a gain of greater than 1 dB over a range of wavelengths from 1530 nm to 1565 nm.

13. The fiber laser of claim 12, wherein the fiber exhibits a peak gain of greater than 5 dB.

14. A fiber laser, comprising:
A section of fiber including
A cladding formed from a phosphate glass host; and
A core formed from a similar phosphate glass host co-doped with 0.5–5.0 wt. % $Er_2O_3$ and 5–30 wt. % $Yb_2O_3$;
At least one wavelength-selective reflector having a characteristic linewidth, said reflector at least partially defining an optical resonant cavity of 5 cm or less that includes the section of fiber; and
A multi-mode laser that illuminates the fiber cladding to stimulate erbium and ytterbium ions in the $Er_2O_3$ and $Yb_2O_3$ co-doped core and provide gain;
the length of said cavity being 5 cm or less produces a mode spacing that is sufficiently wide with respect to the wavelength-selective reflector's linewidth that the erbium lases at a single longitudinal mode and said fiber outputs a single longitudinal and single transverse mode signal.

15. The fiber laser of claim 14, wherein the phosphate glass hosts include the following ingredients by weight percentages, $P_2O_5$ from 30 to 80 percent,
$L_2O_3$ from 5 to 30 percent,
MO from 5 to 30 percent, wherein MO is selected from BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof, and wherein the core is co-doped with $Er_2O_3$ from 0.5 to 5 weight percent and $Yb_2O_3$ from 5 to 30 weight percent with a sum of 10 to 35 wt. %.

16. The fiber laser of claim 15, wherein the multi-mode pump laser is rated at less than 1.5 W, said fiber laser providing more than 50 mW of output power in the single-mode signal.

17. A fiber laser, comprising:
A section of fiber including
A cladding formed from a phosphate glass host; and
A core formed from the phosphate glass host doped with 0.5–5.0 wt. % $Er_2O_3$ and 0.5–30 wt. % $Yb_2O_3$;
First and second telecom fibers formed from a silica glass and fusion spliced to opposite ends of the linear section of fiber;
First and second wavelength-selective reflectors formed on said first and second telecom fibers and having a characteristic linewidth, said reflectors defining an optical resonant cavity of 5 cm or less that includes the section of fiber; and
A source of pump radiation that illuminates the fiber to excite erbium and ytterbium ions in the co-doped $Er_2O_3$ and $Yb_2O_3$ core and provide gain;
the length of said cavity being 5 cm or less produces a mode spacing that is sufficiently wide with respect to the wavelength-selective reflector's linewidth that the erbium lases at a single longitudinal mode and said section of fiber outputs a single longitudinal and single transverse mode signal into said telecom fiber.

18. The fiber laser of claim 17, wherein the source of pump radiation comprises a single-mode laser that illuminates the fiber core, said core being doped with 0.5–15.0 wt. % $Yb_2O_3$.

19. The fiber laser of claim 18, wherein the phosphate glass hosts include the following ingredients by weight percentages, $P_2O_5$ from 30 to 80 percent,
$L_2O_3$ from 5 to 30 percent,
MO from 5 to 30 percent, wherein MO is selected from BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof; and wherein the core is co-doped with $Er_2O_3$ from 0.5 to 5 wt. % and $Yb_2O_3$ from 0.5 to 5 wt. % with a sum of 2.5 to 10 wt. %.

20. The fiber laser of claim 18, wherein the single-mode pump laser is rated at less than 250 mw, said fiber laser providing more than 50 mW of output power in the single-mode signal.

21. The fiber laser of claim 17, wherein the source of pump radiation comprises a multi-mode laser that illuminates the fiber cladding, said core being doped with 5–30 wt. % $Yb_2O_3$.

22. The fiber laser of claim 21, wherein the phosphate glass hosts include the following ingredients by weight percentages, $P_2O_5$ from 30 to 80 percent,
$L_2O_3$, from 5 to 30 percent,
MO from 5 to 30 percent, wherein MO is selected from BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof; and wherein the core is co-doped with $Er_2O_3$ from 0.5 to 5 weight percent and $Yb_2O_3$ from 5 to 30 weight percent with a sum of 10 to 35 wt. %.

23. The fiber laser of claim 21, wherein the multi-mode pump laser is rated at less than 1.5 W, said fiber laser providing more than 50 mW of output power in the single-mode signal.

24. A fiber laser, comprising:
A section of fiber including,
A cladding formed from a phosphate glass host including $P_2O_5$ from 30 to 80 wt. %, $L_2O_3$ from 5 to 30 wt.

%, MO from 5 to 30 wt. %, MO is selected from BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof; and A core formed from the phosphate glass host co-doped with 0.5–5.0 wt. % $Er_2O_3$ and 0.5–30 wt. % $Yb_2O_3$, the sum of the weight percentages of $Yb_2O_3$ and $Er_2O_3$ being 2.5 to 35 wt. %;

At least one wavelength-selective reflector having a characteristic linewidth, said reflector at least partially defining an optical resonant cavity of 5 cm or less that includes the section of fiber; and A source of pump radiation that illuminates the fiber to excite erbium and ytterbium ions in the $Er_2O_3$ and $Yb_2O_3$ co-doped core and provide gain;

the length of said cavity being 5 cm or less produces a mode spacing that is sufficiently wide, with respect to the wavelength-selective reflector's linewidth so that the erbium lases at a single longitudinal mode and said fiber outputs a single longitudinal and single transverse mode signal.

25. The fiber laser of claim 24, wherein the core is co-doped with 0.5–5 wt. $Er_2O_3$ and 0.5–15 wt. % $Yb_2O_3$.

26. The fiber laser of claim 24, wherein the core is co-doped with 0.5–5 wt. $Er_2O_3$ and 0.5–5 wt. % $Yb_2O_3$.

27. The fiber laser of claim 24, further comprising:

A first telecom fiber formed of silica glass and fusion spliced to the linear section of fiber, said wavelength-selective reflector being formed on said telecom fiber.

28. The fiber laser of claim 27, further comprising:

A second telecom fiber formed of silica glass and fusion spliced to the other end of the linear section of fiber; and A grating formed on said second telecom fiber.

29. A fiber laser, comprising:

A section of fiber including,
A cladding formed from a phosphate glass host including $P_2O_5$ from 30 to 80 wt. %, $L_2O_3$ from 5 to 30 wt. %, MO from 5 to 30 wt. %, MO is selected from BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof; and
A core formed from the phosphate glass host co-doped with 0.5–5.0 wt. % $Er_2O_3$ and 0.5–30 wt. % $Yb_2O_3$, the sum of the weight percentages of $Yb_2O_3$ and $Er_2O_3$ being 2.5 to 35 wt. %;

First and second telecom fibers formed of silica glass fusion spliced to opposite ends of the linear section of fiber;

First and second fiber bragg gratings (FBGs) formed on said first and second telecom fibers to define an optical resonant cavity of 5 cm or less; and A source of pump radiation that illuminates the fiber to excite erbium and ytterbium ions in the $Er_2O_3$ and $Yb_2O_3$ co-doped core and provide gain;

the length of said cavity being 5 cm or less produces a mode spacing that is comparable to or larger than the first FBG's linewidth so that the erbium lases at a single longitudinal mode and said fiber outputs a single longitudinal and single transverse mode signal.

30. The fiber laser of claim 29, wherein the first telecom fiber is a polarization maintaining fiber.

31. The fiber laser of claim 29, wherein the core is co-doped with 0.5–5 wt. $Er_2O_3$ and 0.5–15 wt. % $Yb_2O_3$.

32. The fiber laser of claim 29, wherein the core is co-doped with 0.5–5 wt. $Er_2O_3$ and 0.5–5 wt. % $Yb_2O_3$.

* * * * *